United States Patent [19]

Okuyama et al.

[11] Patent Number: 5,986,836
[45] Date of Patent: Nov. 16, 1999

[54] MAGNETIC RECORDING METHOD AND DEVICE

[75] Inventors: Chiaki Okuyama; Kenji Sato; Iwao Okamoto, all of Kawasaki, Japan

[73] Assignee: Fujitsu Limited, Kawasaki, Japan

[21] Appl. No.: 08/955,034

[22] Filed: Oct. 21, 1997

[30] Foreign Application Priority Data

May 26, 1997 [JP] Japan ..................................... 9-149929

[51] Int. Cl.$^6$ .............................. G11B 5/02; G11B 5/147
[52] U.S. Cl. .............................. 360/55; 360/126; 360/110
[58] Field of Search ............................ 360/55, 110, 125, 360/126, 127

[56] References Cited

U.S. PATENT DOCUMENTS

| | | | |
|---|---|---|---|
| 4,974,110 | 11/1990 | Kanamine et al. | 360/126 |
| 5,057,200 | 10/1991 | Lal et al. | 204/192.15 |
| 5,162,158 | 11/1992 | Christner et al. | 428/611 |
| 5,180,640 | 1/1993 | Yamashita et al. | 428/611 |
| 5,402,295 | 3/1995 | Suzuki et al. | 360/126 |
| 5,516,547 | 5/1996 | Shimizu et al. | 427/132 |
| 5,523,173 | 6/1996 | Doerner et al. | 428/611 |
| 5,552,217 | 9/1996 | Yamaguchi et al. | 428/332 |

FOREIGN PATENT DOCUMENTS

| | | |
|---|---|---|
| 7-105525 | 4/1995 | Japan . |
| 8-077544 | 3/1996 | Japan . |

OTHER PUBLICATIONS

Fujitsu Sci. Tech. J.; Thin Film Head Technology; Misumasa Oshiki, Shigemitsu Hamasaki; Feb. 1991; vol. 26, No. 4, pp. 353–364.

IEEE Transactions on Magnetics; Magnetization Structures of Tracks Recorded on Longitudinal Thin Film Medium; Honda et al.; Nov. 1993; vol. 29, No. 6, pp. 3721–3723.

IEEE Transactions on Magnetics; Interactions in CoPtCr/SiO$_2$ Composite Thin Films; M. El–Hilo and K. O'Grady; Nov. 1993; vol. 29, No. 6, pp. 3724–3726.

IEEE Transactions on Magnetics; Track–Edge Noise Versus Erasure State; B.D. Martin and D.N. Lambeth; Sep. 1992; vol. 28, No. 5, pp. 3276–3278.

IEEE Transactions on Magnetics; Experimental Study of Track Edge Noise Distribution in Narrow Track Recording; Terence T. Lam and Jian–Gang Zhu; Nov. 1994; vol. 30, No. 6, pp. 4245–4247.

IEEE Transactions on Magnetics; Magnetic Force Microscopy Study of Edge Overwrite Characteristics in Thin Film Media; Jian–Gang Zhu, Yansheng Luo and Juren Ding; Nov. 1994; vol. 30, No. 6, pp. 4242–4244.

IEEE Transactions on Magnetics; Track Edge Overwrite and Easy Axis Orientation in Narrow Track Recording; Ziao–Gang Ye and Jian–Gang Zhu; Nov. 1993; vol. 20, No. 6, pp. 3978–3980.

IEEE Transactions on Magnetics; Offtrack Characteristics on Media Noise for Co–Cr–Ta Films; S. Tsuboi, et al.; Nov. 1995; vol. 31, No. 6, pp. 2791–2793.

Singh et al (IEEE Transactions on Magnetrics, vol. 31, No. 6, Nov. 1995, pp. 3108–3110, "The Effect of Record Flying Height on Trackedge Noise in Thin Film Media").

*Primary Examiner*—William J. Klimowicz
*Attorney, Agent, or Firm*—Greer, Burns & Crain, Ltd.

[57] ABSTRACT

A magnetic recording method employing a magnetic head and a magnetic recording medium, wherein the size ($H_n$) of the magnetic field which gives the maximum differential for the direct current remanance curve of the magnetic recording medium and the intensity ($H_{head}$) of the recording magnetic field of the magnetic head at the track center position are in the relationship: $H_{head}/2 \leq H_n \leq H_{head}$, and the maximum value for the magnetic interaction between magnetic particles of the magnetic recording medium ($\delta M$) is less than 0.3.

14 Claims, 10 Drawing Sheets

Fig.1

DC REMANANCE

Fig.2

DC REMANANCE CURVE

Fig.3

SINGLE DIFFERENTIAL CURVE FOR DC REMANANCE

MAGNETIC RECORDING METHOD AND DEVICE

BACKGROUND OF THE INVENTION

1. Field of the Invention

The present invention relates to a magnetic recording method and device employing a magnetic head and a magnetic recording medium, and particularly it relates to a magnetic recording method and magnetic recording device which employ a magnetic recording medium which is capable of high density recording by high magnetic coercive force and has reduced medium noise. The magnetic recording method of the invention is a magnetic recording method which not only reduces medium noise during on-track time, but also reduces the diffusion and height of medium noise during off-track time.

2. Description of the Related Art

The pulse width Pw50 of a waveform reproduced from in-plane magnetic recording media is known to be related to the magnetostatic characteristics of magnetic coercive force Hc, remanance $M_r$ and magnetic layer thickness t of the medium by the following equation:

$$a (t \times M_r/Hc)_{1/2}$$

$$Pw50 = (2(a+d)^2 + (a/2)^2)^{1/2}$$

Here, d represents the magnetic spacing.

Basically, smaller pulse widths are suitable for high recording density media. Thus, a high density recording medium is preferably a medium which has a minimized magnetic layer thickness and produces the maximum magnetic coercive force. When using magnetic resistance (MR) heads and giant magnetic resistance (G-MR) heads, sufficient output can be obtained even with a tBr of 120 G$\mu$m or less.

With current CoCr alloy-based magnetic recording media, the magnetic coercive force has been improved by varying the concentration of Cr and by adding Pt, etc. A greater concentration of Cr in the CoCr alloy is associated with a higher degree of magnetic isolation of the magnetic particles, and can also be employed as a means of lowering the noise.

Recent years have seen a greater demand for reduced medium noise in addition to the high magnetic coercive force for producing practical high sensitivity MR heads. Japanese Unexamined Patent Publication No. 7-105525 concentrates on the fact that the medium noise is related to the degree of magnetic interaction between the magnetic particles ($\delta M$ value), and the degree of magnetic interaction (maximum $\delta M$ value) demanded for low noise media is defined as 0.3–0.7. However, this prior art is primarily aimed at reducing the noise in the transition region of magnetization and does not deal with improving the off-track characteristics of medium noise.

A study on track edge noise has been reported by B. D. Martin, D. N. Lambeth et al. in IEEE Trans. Mag., 28, 3276 (1992). According to their report, when a bit cell (hard bit cell) with a magnetization oriented opposite to the previous DC-erased direction is recorded on a medium surface subjected to DC erasure, the track edge noise is caused by disordered magnetization patterns generated on the track edge section of the bit cell.

High track recording density and narrow tracks for high track density are both essential to achieve high density magnetic recording media. However, because of the relative increase in the ratio of the track edges as the tracks are narrowed, reduction in track edge noise has become an issue. It is an object of the present invention to provide a magnetic recording system suitable for high density recording which reduces transition noise while also minimizing the diffusion and size of the track edge noise.

SUMMARY OF THE INVENTION

In order to accomplish the object stated above, the present invention provides a magnetic recording method which employs a magnetic head and a magnetic recording medium, characterized in that the intensity $H_n$ of the magnetic field which gives the maximum differential for the direct current remanance curve of the magnetic recording medium and the intensity $H_{head}$ of the recording magnetic field of the magnetic head at the center position of the recording track of the magnetic recording medium are in the relationship: $H_{head}/2 \leq H_n \leq H_{head}$, and the magnetic interaction $\delta M(H)$ between the magnetic fine particles of the magnetic recording medium is 0.3, as represented by the following equation:

$$\delta M(H) = M_d(H) - \{1 - 2M_r(H)\}$$

where $M_d$(H) is the direct current remanance curve and $M_r$(H) is the alternating current remanance curve, as well as a magnetic recording device which employs the method.

DESCRIPTION OF THE PREFERRED EMBODIMENTS

Figure 1:
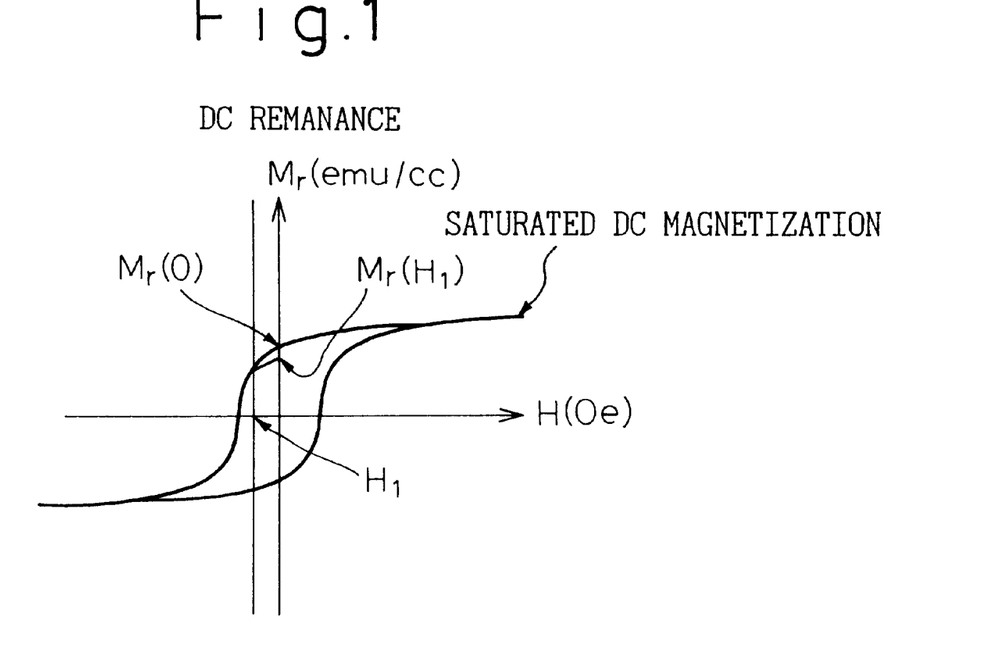
FIG. 1 is an illustration of how direct current remanance is determined.
Figure 2:
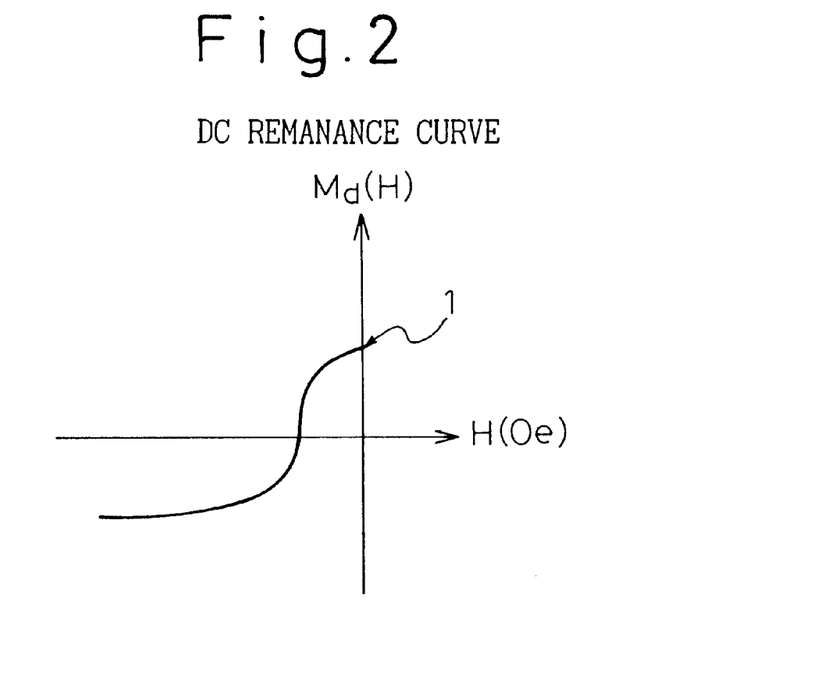
FIG. 2 is an illustration of an example of a direct current remanance curve ($M_d$(H)).
Figure 3:
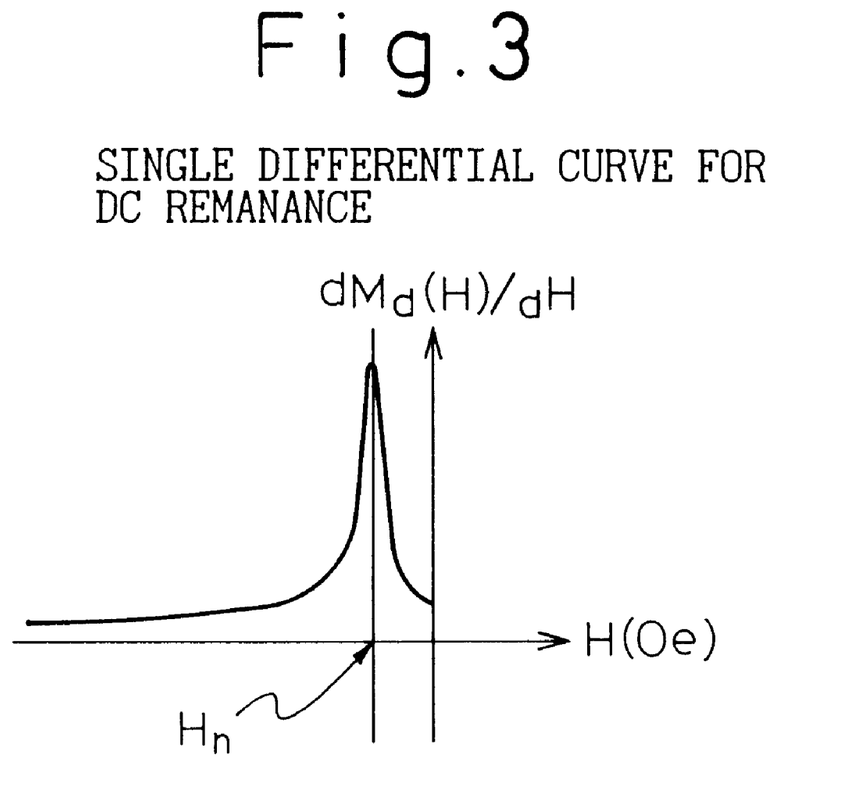
FIG. 3 is an illustration of an example of a single differential curve for a direct current remanance curve ($dM_d$(H)/dH).

Referring to FIG. 1, the direct current remanance (DC remanance) $M_r(H_1)$ is the amount of the remanance observed when a medium in a state of saturated direct current magnetization in a given direction is subjected to an external magnetic field $H_1$ in the direction opposite to the saturated magnetic field and then the external magnetic field is restored to zero. If $M_d(H_1)$ is defined as the direct current remanance $(M_r(H_1))$ normalized with the saturation remanance $(M_r(0))$ and $M_d(H)$ is measured while gradually raising $H_1$ from zero and plotted against the magnetic field (H), the result is a direct current remanance curve (DC remanance curve) $M_d(H)$ such as shown in FIG. 2. Differentiation of the direct current remanance curve $(M_d(H))$ for the magnetic field yields $(dM_d/dH)$, giving a curve such as shown in FIG. 3. If the magnetic field, where $dM_d/dH$ is maximum, is defined as $H_n$, $H_n$ corresponds to the magnetic field in which change in the remanance of the magnetic recording medium occurs most markedly. That is, the state after application of $H_n$ can be considered to be the state with the greatest degree of disorder of magnetization. The track edge noise is caused by disorder of magnetization in the medium generated at the edge section of the track where the head magnetic field is close to $H_n$. On the other hand, reference to FIG. 3 shows that $dM_d(H)/dH$ increases and decreases markedly around $H_n$, and that when H deviates somewhat from $H_n$, $dM_d(H)/dH$ becomes smaller.

In principle, when the track width can be considered to be infinite, i.e. when the track width is sufficiently wider than the spacing or gap length, the recording magnetic field at the track edge section is thought to be about ½ of that at the track center. According to the present invention, the $H_n$ of the medium is at least ½ of the $H_{head}$ of the recording magnetic field near the center of the track, to thus suppress diffusion of track edge noise.

The amount of the remanance fluctuation is also believed to be related to the degree of interaction between the magnetic particles.

The quantity δM is often used to evaluate the strength of magnetic interaction (exchange and magneto static interaction) working between magnetic particles. δM is calculated by the following equation:

$$\delta M = M_d(H) - \{1 - 2 \times M_i(H)\}$$

where $M_d(H)$ is the above-mentioned direct current remanance curve. $M_i(H)$ is known as the alternating current remanance curve (AC remanance curve), and it is the value for remanance at a state of AC erasure normalized at saturation remanance $M_r(0)$. δM is discussed in P. I. Mayo et al., IEEE Trans, Mag, 26, No.5 (1990), D. Speliotis et al., Journal of Magnetism and Magnetic Materials 120 (1993), etc.

If the degree of magnetic interaction between magnetic particles of the magnetic recording medium ($\delta M_{max}$: maximum value of δM) is less than 0.3, it is possible to reduce both the height of the transition noise and the track edge noise level. δM is preferably 0.2 or lower, or further more preferably 0.15 or lower.

The magnetic recording system of the invention is a magnetic recording system suitable for high track density recording, wherein the $H_n$ of the medium is greater than the magnetic field of the edge section of the recording head in order to suppress diffusion of the track edge noise, while the magnetic interaction between the particles ($\delta M_{max}$: maximum value of δM) is minimized to reduce the transition noise and the track edge noise.

$H_n$ depends on the material of the magnetic recording medium (magnetic recording film) and, as the examples which follow will demonstrate, an $H_n$ of 2300 Oe was obtained with $Co_{82}Cr_{13}Ta_5$ and 2900 Oe with $Co_{74}Cr_{17}Pt_5Ta_4$. Since a medium with a higher $H_n$ has better recording resolution, a higher $H_n$ is preferred. A CoCr-based alloy containing a small amount of Pt can give a higher $H_n$. Also, the medium noise can be reduced by further adding either or both Ta and Nb to a CoCrPt-based alloy.

The preferred composition for CoCrPt-based alloys is 14–24 at % Cr, 4–20 at % Pt and the remainder Co. The preferred composition for CoCrPt(Ta, Ab)-based alloys is 14–20 at % Cr, 4–20 at % Pt, 0–4 at % (Ta+Nb) and the remainder Co, or more preferably 17–20 at % Cr, 4–15 at % Pt, 0–4 at % (Ta+Nb) and the remainder Co.

Other preferred magnetic materials include CoCrPtWC and CoCrPtTaMn.

The absolute value of $H_n$ is not a direct concern, but in order to prevent the recording magnetic field from being too low it is preferably 1000 Oe or greater, more preferably 1500 Oe or greater and even more preferably 2000 Oe or greater.

The $H_{head}$ can be controlled to achieve the relationship $\frac{1}{2}H_{head} \leq H_n \leq H_{head}$, and the simplest method for accomplishing this is by controlling the recording current. The recording magnetic field is generally proportional to the recording current at first, and then eventually reaches saturation. The recording current can therefore be controlled within a range in which $H_{head}$ varies linearly.

Other parameters controlling the recording magnetic field $H_{head}$ include the Bs value (saturation magnetic flux density) of the core material of the magnetic head, the gap length, other geometrical features of the magnetic head, and the head flying height. These can be controlled as necessary by a person skilled in the art.

Incidentally, tBr (t=film thickness, Br=remanance) is preferably 120 G·μm or less.

The magnetic interaction δM between the magnetic fine particles of the magnetic recording medium depends on the material and method of making the medium. According to the present invention, δM is less than 0.3. Specifically, in order to reduce the magnetic interaction δM between magnetic crystalline particles composed primarily of Co or the like, a nonmagnetic inclusion such as Cr, Ta or Nb may be segregated between the magnetic crystalline particles. For this purpose it is necessary to form the film using a magnetic alloy material composed primarily of Co or the like and containing a relatively high concentration of Cr (14–20 at %) and Ta, Nb (Ta+Nb =0–4 at %). In addition, efficient segregation of the nonmagnetic inclusion between the magnetic particles requires a certain substrate temperature (preferably 200° C.–300° C.) and substrate bias (preferably −150 V to −400 V) for the film deposition.

The track width of the magnetic recording medium is designed to be wider than the effective core width of the read element, to avoid deterioration in the S/N ratio by track edge noise.

According to the present invention, virtually all track edge noise is eliminated to allow extreme narrowing of the track width down to the effective core width of the read element. Also, since the present invention results in virtually no side erase width, the track pitch can be drastically narrowed down to the track width.

Figure 4A:
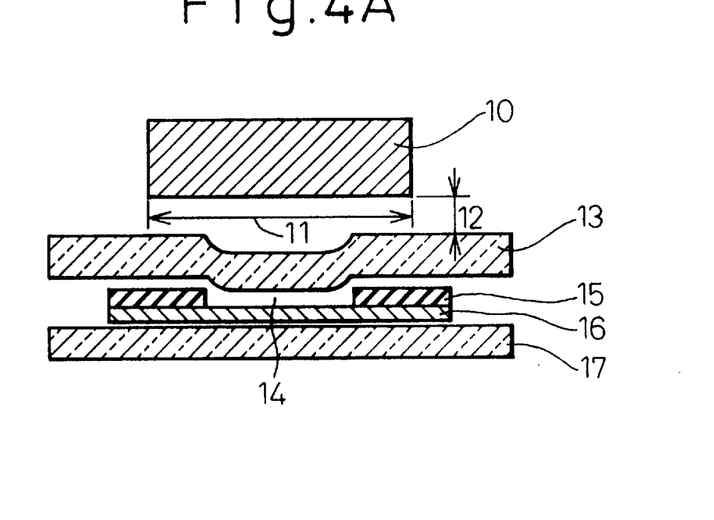
FIGS. 4A and 4B and 4C are section and plan views of a magnetic head and the method of recording to a magnetic disk.
Figures 4B, 4C:
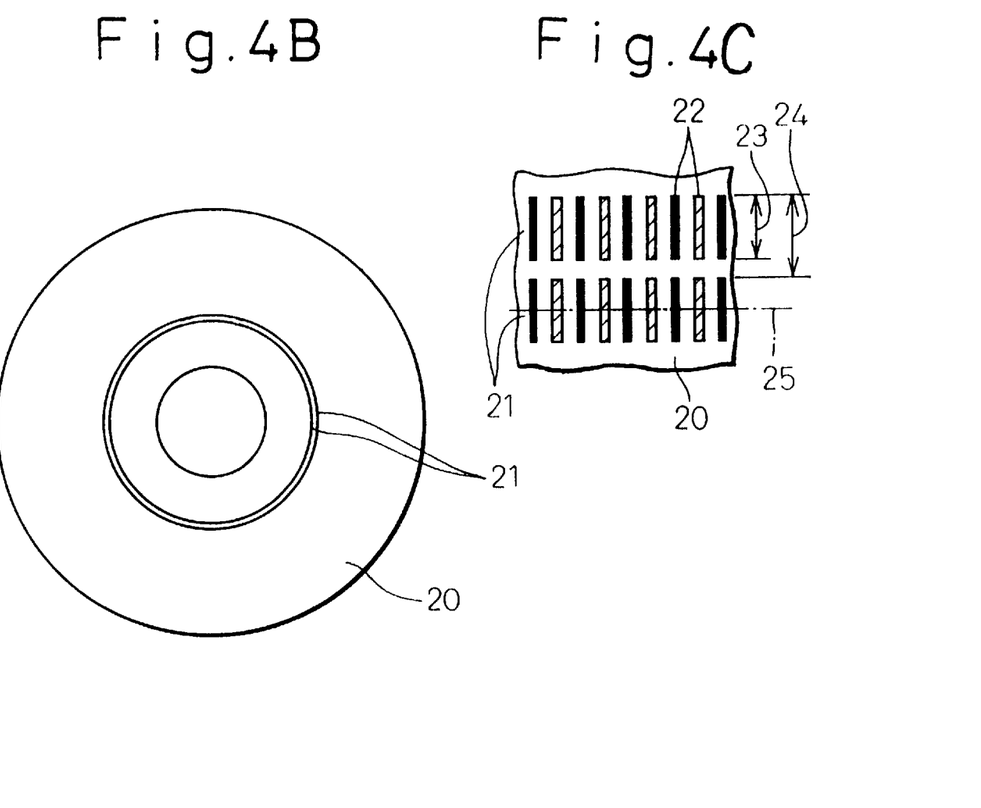

EXAMPLES (1) FIGS. 4A, 4B and 4C are illustrations of a magnetic recording method. Referring to FIG. 4A, when the magnetic recording medium 1 rotates, the slider 2 flies and recording or reading is performed by the thin-film magnetic head 3 on the magnetic recording medium 1.

The magnetic recording medium 1 has a recording film made of a CoCrPt-based magnetic material or the like on the nonmagnetic substrate, and usually there is also formed a protective film of carbon, diamond-like carbon, etc.

On the other hand, the magnetic head used according to the invention has a write element and MR or G-MR read element formed on one head device, and typically it has the construction shown in FIG. 4A. In this FIG. 10 is a write magnetic pole, 11 is the write core width, 12 is a write gap, 13 is an upper shield, 14 is a read gap, 15 is a pullout conductor layer, 16 is an MR or G-MR element and 17 is a lower shield. The pullout conductor layer is cut to a prescribed width in the lengthwise direction of the MR (G-MR) element 16 and connected to both ends of the element. The sense current flows through the pullout conductor layer 15 to the element and then to the rectangular detection region defined by the conductor layer. Also, the magnetic recording medium (C) moves below the head in the direction of the X-axis, and the MR head detects the signal magnetic field from the medium as resistance changes in the detection region. The shield 13 on the write gap 12 side of the MR (G-MR) element also serves as the magnetic pole of the write element.

Referring to FIGS. 4B and 4C, bands of a magnetic signal 22 are recorded on a magnetic recording medium 20 by a magnetic head, and each of the bands are collectively referred to as tracks 21. The width of each track 21 is called the track width 23, and the distance between adjacent tracks 21 is called the track pitch 24. The center of the track is called the track center 25.

(2) The magnetic recording method according to the invention will now be compared with a magnetic recording method which is different from the invention.

The writing and reading of signals for this measurement were accomplished using a head with a Bs write magnetic pole made of an FeN magnetic pole having a write core width 11 of 3 μm, and an MR element 16 with a read width of 1.9 μm. Based on simulation, the intensity of the recording magnetic field of the head used for the measurement (magnetic electrode Bs=20,000 G, magnetic spacing=0.075 μm, write gap=120.5 μm) was calculated to be 5500 Oe near the center of the track. The medium noise was measured with a 120 kFCI signal.

In the magnetic recording method according to this example of the invention, a magnetic recording medium with an $H_n$ of 2900 Oe was used (NiP-Al substrate coated with a 25 nm thick $Cr_{10}Mo_{10}$ underlayer, in turn coated with a 25 nm thick $Co_{74}Cr_{17}Pt_5Ta_4$ recording layer, in turn coated with a 12 nm thick carbon protective layer), and for comparison a magnetic recording medium with an $H_n$ of 2500 Oe was used (NiP-Al substrate coated with a 35 nm thick Cr underlayer, in turn coated with an 18 nm thick $Co_{82}Cr_{13}Ta_5$ layer, in turn coated with a 15 nm thick carbon layer).

Figure 5:
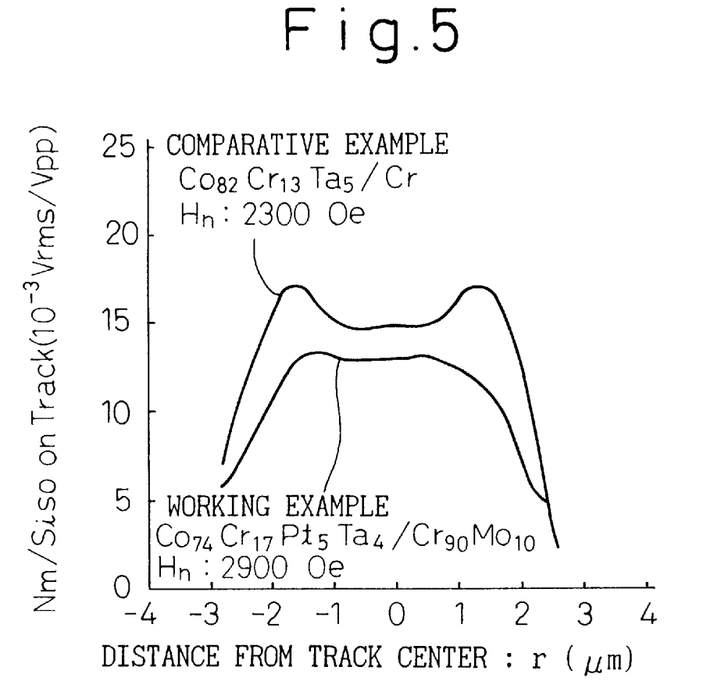
FIG. 5 shows a comparison between the cross-track characteristics of normalized medium noise for a magnetic recording medium according to the invention ($C/CO_{74}Cr_{17}Pt_5Ta_4/Cr_{90}Mo_{10}$) and a magnetic recording medium not according to the invention ($C/Co_{82}Cr_{13}Ta_5/Cr$).

FIG. 5 shows the cross-track characteristics for normalized medium noise as measured for the example ($CO_{74}Cr_{17}Pt_5Ta_4$) and the comparative example ($Co_{82}Cr_{13}Ta_5$). The horizontal axis indicates the position of the reading head in the cross track direction and the vertical axis indicates the medium noise power on the track. $N_m/S_{iso}$ is the normalized medium noise, wherein the values for medium noise are normalized with a signal output of isolated waveform.

The magnetic recording medium according to the invention ($C/CO_{74}Cr_{17}Pt_5Ta_4/Cr_{90}Mo_{10}$) has low diffusion or expansion of track edge noise and almost no protuberance of track edge noise could be found.

Figure 6:
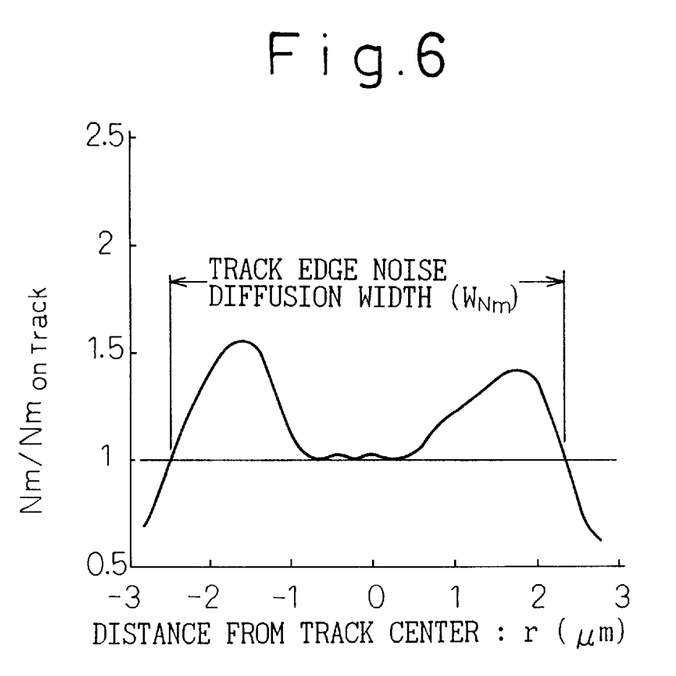
FIG. 6 is a graph defining track edge expansion.

Table 1 below shows the results of investigating the changes in the track edge noise spacial width ($W_{Nm}$) with the aforementioned two media with different $H_n$. As explained below for FIG. 6, $W_{Nm}$ was defined as the cross-track region wherein the height of medium noise is greater than the noise value during on-track time.

TABLE 1

| Medium | Hc (Oe) | Brt (G/μm) | $\delta M_{max}$ | $H_n$ (Oe) | $W_{Nm}$ (μm) |
|---|---|---|---|---|---|
| $Co_{82}Cr_{13}Ta_5$ | 2070 | 100 | 0.55 | 2300 | 5.50 |
| $Co_{74}Cr_{17}Pt_5Ta_4$ | 2720 | 110 | 0.10 | 2900 | 3.62 |

Table 1 shows that $W_{Nm}$ is narrower in media with higher $H_n$.

As explained above, generation of disorder of magnetization is highest when the external magnetic field ($H_n$) applied is one in which most magnetization is reversed drastically. Thus, in the medium according to the invention which has a comparatively high $H_n$, the region in which disorder of magnetization occurs approaches the edge of the write element which has a high recording magnetic field, thus allowing the track edge noise diffusion ($W_{Nm}$) to be narrowed. The $H_n$ of the $C/Co_{74}Cr_{17}Pt_5Ta_4/Cr_{90}Mo_{10}$ medium was 2900 Oe, which was about 53% of the recording magnetic field (5500 Oe) at the track center of the recording head used, but a preferred $H_n$ for the medium is believed to be one which satisfies the following inequality: $H_{head}/2 \leq H_n \leq H_{head}$, where $H_{head}$ is the recording magnetic field at the track center of the recording head used. This is because, as already explained, the recording magnetic field at the track edge section is believed to be about ½ of that at the track center section.

Figure 7:
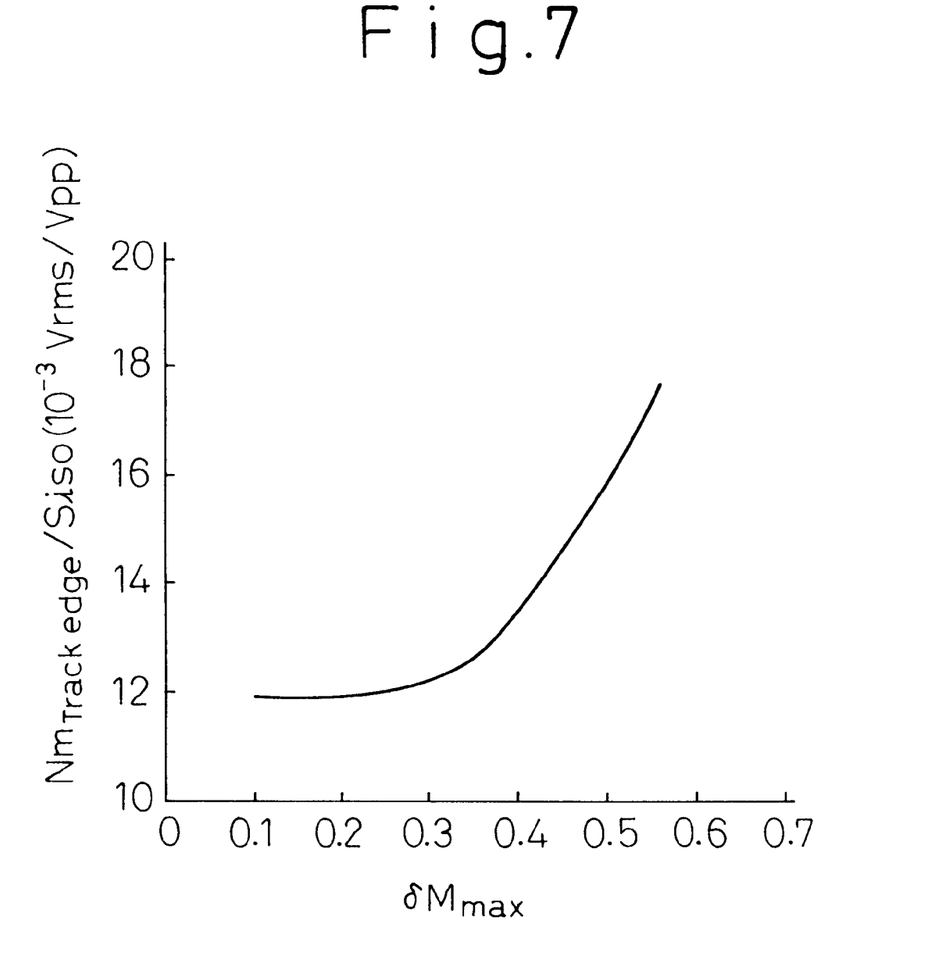
FIG. 7 shows the change in the height of track edge noise with respect to the degree of interaction between magnetic particles ($\delta M_{max}$).

(3) FIG. 7 shows how the track edge noise normalized with an isolated signal output changes with respect to the maximum value ($\delta M_{max}$) for the magnetic interaction of the medium. It is apparent that when $\delta M_{max} < 0.30$, the track edge noise is reduced markedly. This is because when $\delta M_{max} < 0.30$ the reduction in magnetic interaction is accompanied by a less disorder of magnetization of the medium generated at the track edge section. Thus it is clear that for lower track edge noise the $\delta M_{max}$ of the medium is preferred to be smaller. High track density media preferably have the $\delta M_{max}$ value below 0.30. The $\delta M_{max}$ value is even more preferably 0.2 or lower.

(4) An example of side erasure will now be given as a supplementary illustration of the importance of the relationship between the $H_n$ and the recording magnetic field ($H_{head}/2 \leq H_n \leq H_{head}$) according to the present invention.

Figure 8:
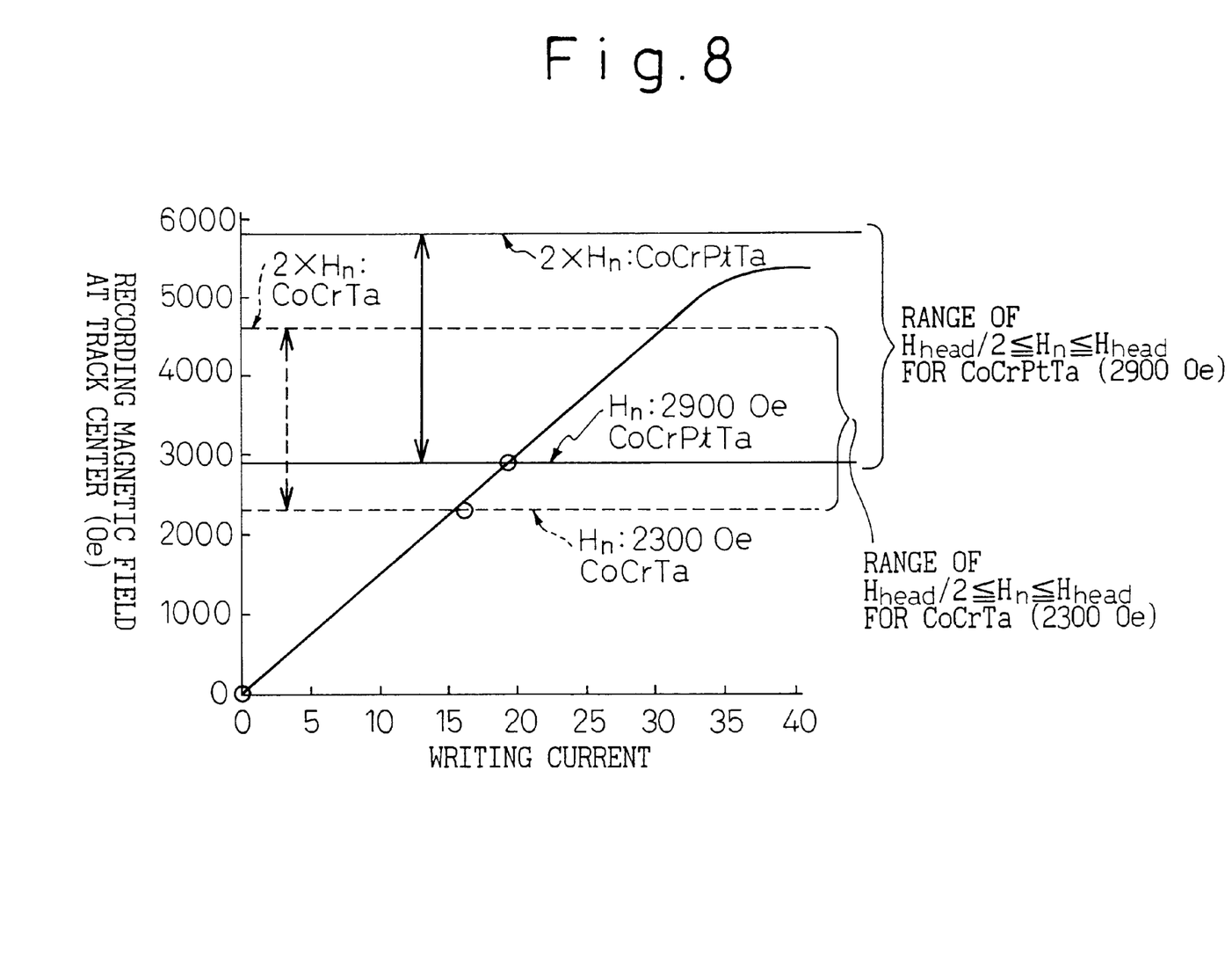
FIG. 8 shows the relationship between the head recording current and the head magnetic field at the track center, for the example.

FIG. 8 shows change in the intensity of the head magnetic field near the track center on the medium surface, with respect to the recording current (Iw) for the head used in this example. However, this was determined from the results (DC demagnetization noise measurement) of a read/write (R/W) experiment. Although the recording magnetic field is proportional to recording current (Iw) in the region of low Iw, it is thought that the recording magnetic field reaches saturation in the region of high Iw (not shown) at about 30 mA or greater.

FIG. 8 shows the levels of $H_n$ and $2 \times H_n$ for the two media given as examples, CoCrTa and CoCrPtTa, as dotted and thin lines, respectively. The magnetic field regions defined between each of these lines (each of the media are identified with arrows) are the regions according to the invention ($H_{head}/2 \leq H_n \leq H_{head}$) for each medium. For example, recording at 35 mA on a CoCrTa medium with an $H_n$ of 2300 Oe is outside the scope of the invention, while recording at 25 mA is within the above-mentioned range for $H_n$ and the recording magnetic field according to the invention.

Figure 9:
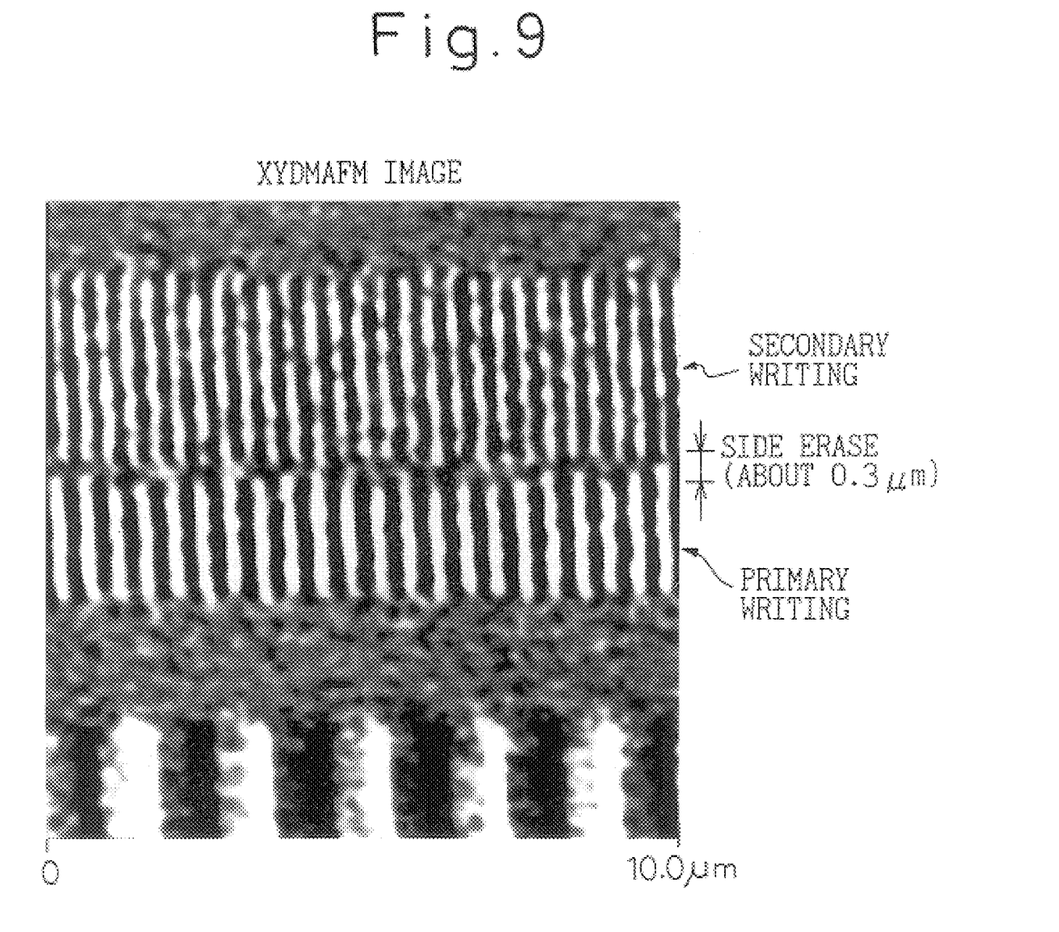
FIG. 9 is an MFM observation image of magnetic recording according to the comparative example.

FIG. 9 is an MFM observation image of a signal pattern by O/W recording with slight shifting (2 $\mu$m) of the 120 kFCI and 150 kFCI signals, at an Iw which gives the CoCrTa medium a recording magnetic field ($H_n < \frac{1}{2}H_{head}$) not in the range of the present invention ($H_{head}/2 \leq H_n \leq H_{head}$). It is clear that O/W recording by the later recorded 150 kFCI and previously recorded 120 kFCI on the 150 kFCI track has resulted in about 0.3 $\mu$m of side erasure (erasure produced at the edge of the track). This was produced because the $H_n$ of the medium was relatively smaller than the magnetic field leaking from the track edge of the head (about 5500/2).

Figure 10:
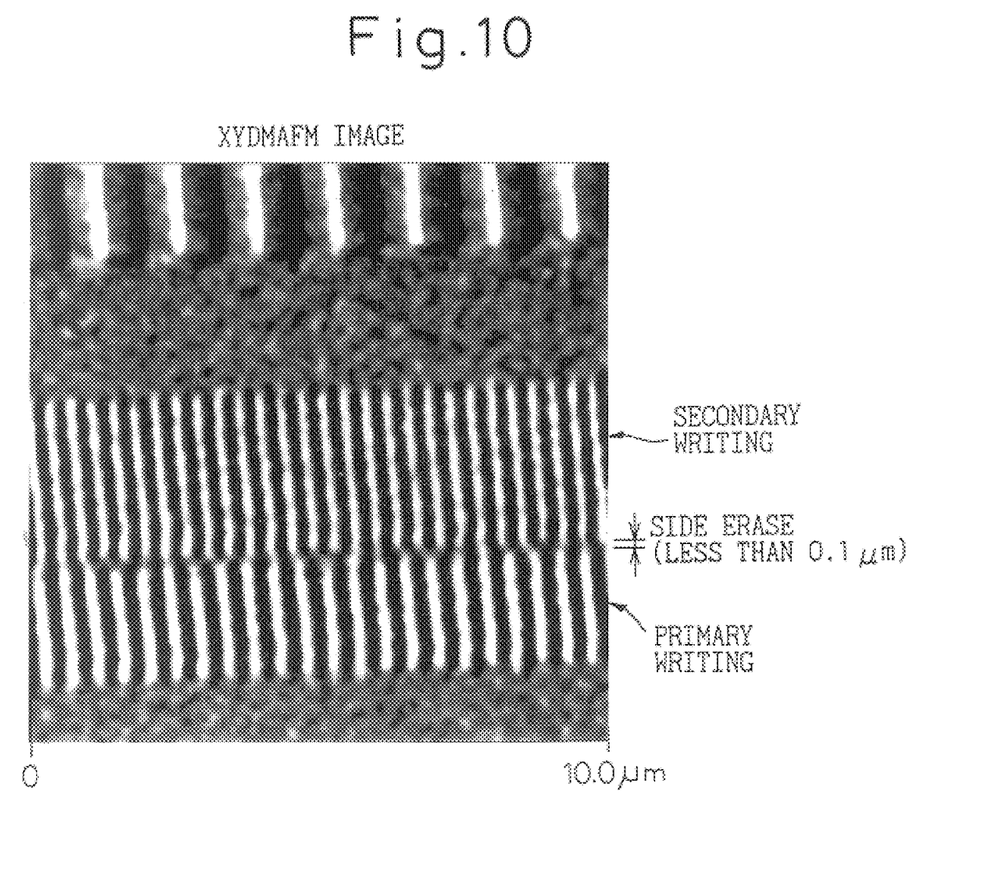
FIG. 10 is an MFM observation image of magnetic recording according to the example.

On the other hand, FIG. 10 is an MFM observation image of a pattern of O/W recording in the same manner described above, at an Iw which gives the CoCrPtTa medium a recording magnetic field in the range of the present invention ($H_{head}/2 \leq H_n \leq H_{head}$). It is clear that recording with the recording magnetic field and $H_n$ in the relationship according to the invention produces virtually no side erasure (0.1 $\mu$m or less). It can therefore be said that the construction of the invention will be more suitable for obtaining narrow tracks.

An explanation will now be given regarding the relationship between the range for $\delta M_{max}$ required for the invention and the degree of side erasure.

Basically, side erasure is not determined merely by the head magnetic field and medium $H_n$ discussed above, but rather differs depending on the degree of interaction between magnetic particles, which is a characteristic unique to the medium. The aforementioned measurement of the $\delta M$ is a typical simple measurement method which provides an estimation of the degree of particle interaction. It is known that the maximum value for the $\delta M$ plot increases as the particle interaction increases.

Figure 11:
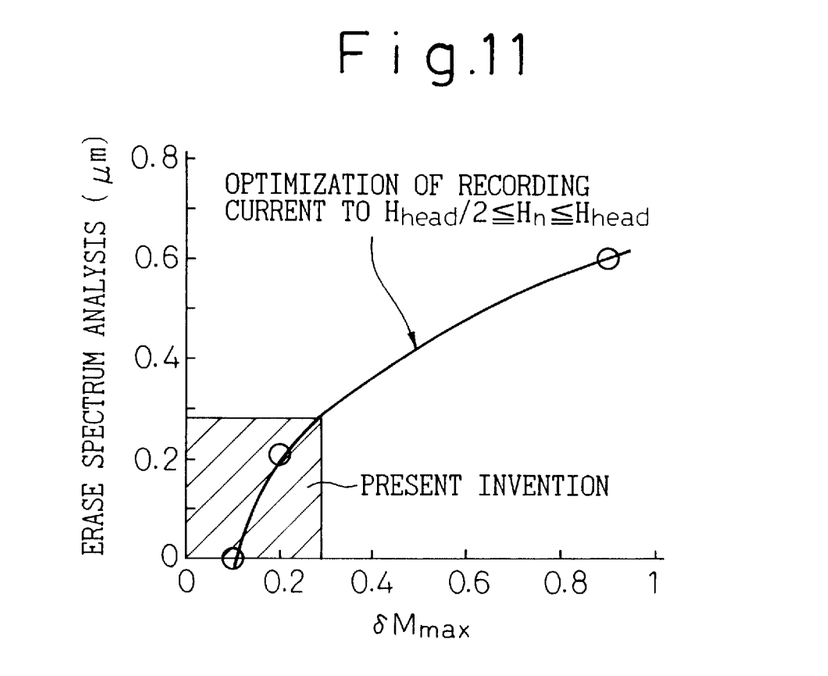
FIG. 11 shows the relationship between side erasure and $\delta M_{max}$.

FIG. 11 illustrates the relationship between the degree of side erasure and the $\delta M_{max}$. In this measurement, however, Iw is adjusted so that the relationship between the head magnetic field and the medium $H_n$ falls within the range according to the invention. Shown here is the relationship between the $\delta M_{max}$ value and the side erasure. Clearly, the degree of side erasure is sharply reduced when $\delta M_{max} < 3$ according to the invention.

Figure 12:
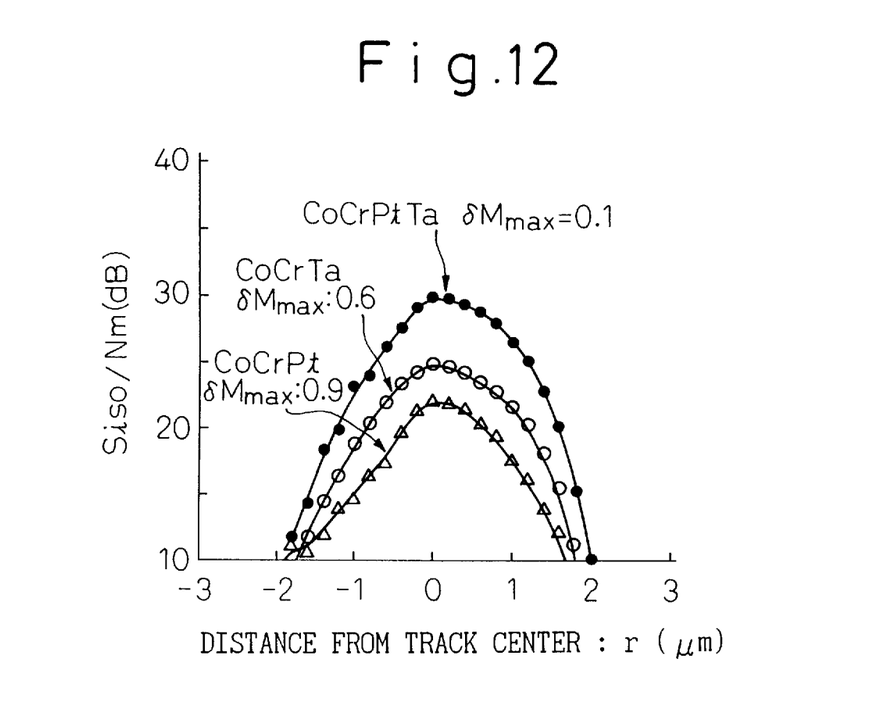
FIG. 12 is an SNR cross-track profile for isolated tracks of a medium.
Figure 13:
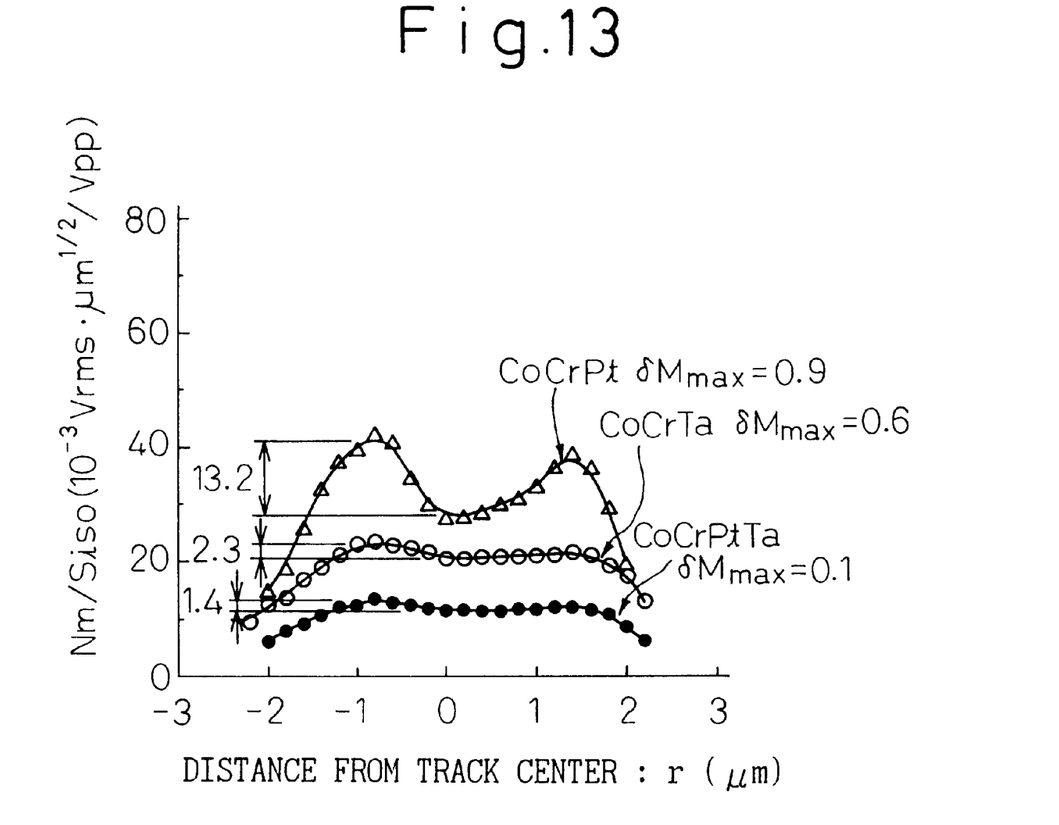
FIG. 13 is a cross-track profile for medium noise.

The above explanation concerns the effect of the invention in terms of side erasure; the effect in terms of the isolated track signals and noise profile will now be explained. FIG. 12 is an SNR cross-track profile for isolated tracks of the medium according to the invention and the one outside the scope of the invention. It is clear that the SNR of the CoCrPtTa medium according to the invention is superior to that of the other over a wide cross-track range. FIG. 13 shows a cross-track profile for medium noise. It is apparent that the medium according to the invention, CoCrPtTa, has lower on-track noise and track edge noise compared to the other medium not according to the invention. The reduction in medium noise can be attributed to the lower particle interaction in the CoCrPtTa medium.

In the magnetic recording system of the invention, the $H_n$ of the medium is at least $\frac{1}{2}$ of the recording magnetic field of the recording head near the track center and $\delta M_{max}$ is less than 0.30, to thus provide a magnetic recording medium suitable for high linear recording density and high track density recording, wherein the diffusion and not only the transition noise but also the track edge noise are suppressed.

We claim:

1. A magnetic recording method which employs a magnetic head and a magnetic recording medium, characterized in that the intensity $H_n$ of the magnetic field which gives the maximum differential for the direct current remanance curve of the magnetic recording medium and the intensity $H_{head}$ of the recording magnetic field of the magnetic head at the center position of a recording track of the magnetic recording medium are in the relationship: $H_{head}/2 \leq H_n \leq H_{head}$, and the magnetic interaction $\delta M(H)$ between magnetic fine particles of the magnetic recording medium is less than 0.3, as represented by the following equation:

$$\delta M(H) = M_d(H) - \{1 - 2M_r(H)\}$$

where $M_d(H)$ is the direct current remanance curve and $M_r(H)$ is the alternating current remanance curve.

2. The magnetic recording method of claim 1, wherein the magnetic recording medium is a thin-film of a CoCrPt alloy.

3. The magnetic recording method of claim 2, wherein said CoCrPt alloy has composition: Cr 14–24 at %, Pt 4–20 at %, the remainder being Co.

4. The magnetic recording method of claim 1, wherein the magnetic recording medium is a thin-film of an alloy containing at least one of Ta and Nb in addition to CoCrPt alloy.

5. The magnetic recording method of claim 4, wherein said alloy has a composition: Cr 14–20 at %, Pt 4–20 at %, (Ta +Nb) 0–4 at %, the remainder being Co.

6. The magnetic recording method of claim 1, wherein the tBr (t=film thickness, Br=remanance) of the magnetic recording medium is 120 G $\mu$m or less.

7. The magnetic recording method of claim 1 wherein the magnetic interaction $\delta M(H)$ is less than 0.2.

8. The magnetic recording method of claim 1 wherein the magnetic interaction $\delta M(H)$ is less than 0.15.

9. A magnetic recording device comprising a magnetic head and a magnetic recording medium, characterized in that the intensity $H_n$ of the magnetic field which gives the maximum differential for the direct current remanance curve of the magnetic recording medium and the intensity $H_{head}$ of the recording magnetic field of the magnetic head at the center position of a recording track of the magnetic recording medium are in the relationship: $H_{head}/2 \leq H_n \leq H_{head}$, and the magnetic interaction $\delta M(H)$ between magnetic fine particles of the magnetic recording medium is less than 0.3, as represented by the following equation:

$$\delta M(H) = M_d(H) - \{1 - 2M_r(H)\}$$

where $M_d(H)$ is the direct current remanance curve and $M_r(H)$ is the alternating current remanance curve.

10. The magnetic recording device of claim 9, wherein the magnetic recording medium is a thin-film of a CoCrPt alloy.

11. The magnetic recording device of claim 9, wherein the magnetic recording medium is a thin-film of an alloy containing at least one of Ta and Nb in addition to CoCrPt alloy.

12. The magnetic recording device of claim 9, wherein the tBr (t=film thickness, Br=remanance) of the magnetic recording medium is 120 G$\mu$m or less.

13. The magnetic recording device of claim 9 wherein the magnetic interaction $\delta M(H)$ is less than 0.2.

14. The magnetic recording device of claim 9 wherein the magnetic interaction $\delta M(H)$ is less than 0.15.

* * * * *